(12) United States Patent
Daoud

(10) Patent No.: US 6,370,309 B1
(45) Date of Patent: Apr. 9, 2002

(54) SPLICE HOLDER WITH A SELF-MOUNTING FEATURE

(75) Inventor: Bassel Hage Daoud, Parsippany, NJ (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/364,816

(22) Filed: Jul. 30, 1999

(51) Int. Cl.⁷ ............................................. G02B 6/00
(52) U.S. Cl. .................................... 385/135; 385/137
(58) Field of Search ............................ 385/134, 135, 385/137

(56) References Cited

U.S. PATENT DOCUMENTS 5,995,700 A * 11/1999 Burek et al. ............... 385/135
6,009,224 A * 12/1999 Allen .......................... 385/135
6,081,644 A *  6/2000 Stateczny et al. ........... 385/135

* cited by examiner

Primary Examiner—Cassandra Spyrou
Assistant Examiner—Euncha Cherry
(74) Attorney, Agent, or Firm—Howard C. Miskin; Gloria Tsui-Yip

(57) ABSTRACT

The combination of a fiber optic tray and a splice holder with a self-mounting feature for fiber optic cables with the fiber optic tray having a latch therein in the form of an undercut recess. The splice holder has a latch engaging element in the form of tabs extending therefrom. The latch and latch engaging element adapted to cooperate with each other in order to permit the splice holder to be mounted in the fiber optic tray and to be removed therefrom.

5 Claims, 5 Drawing Sheets

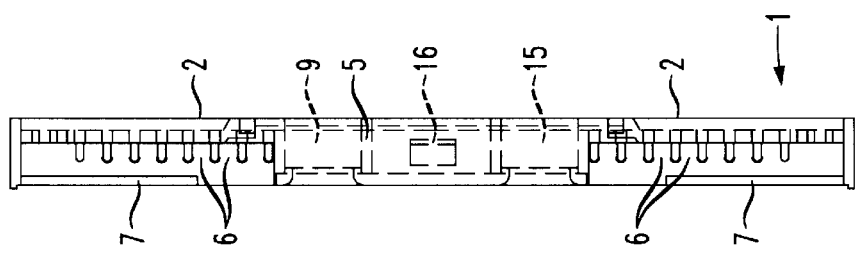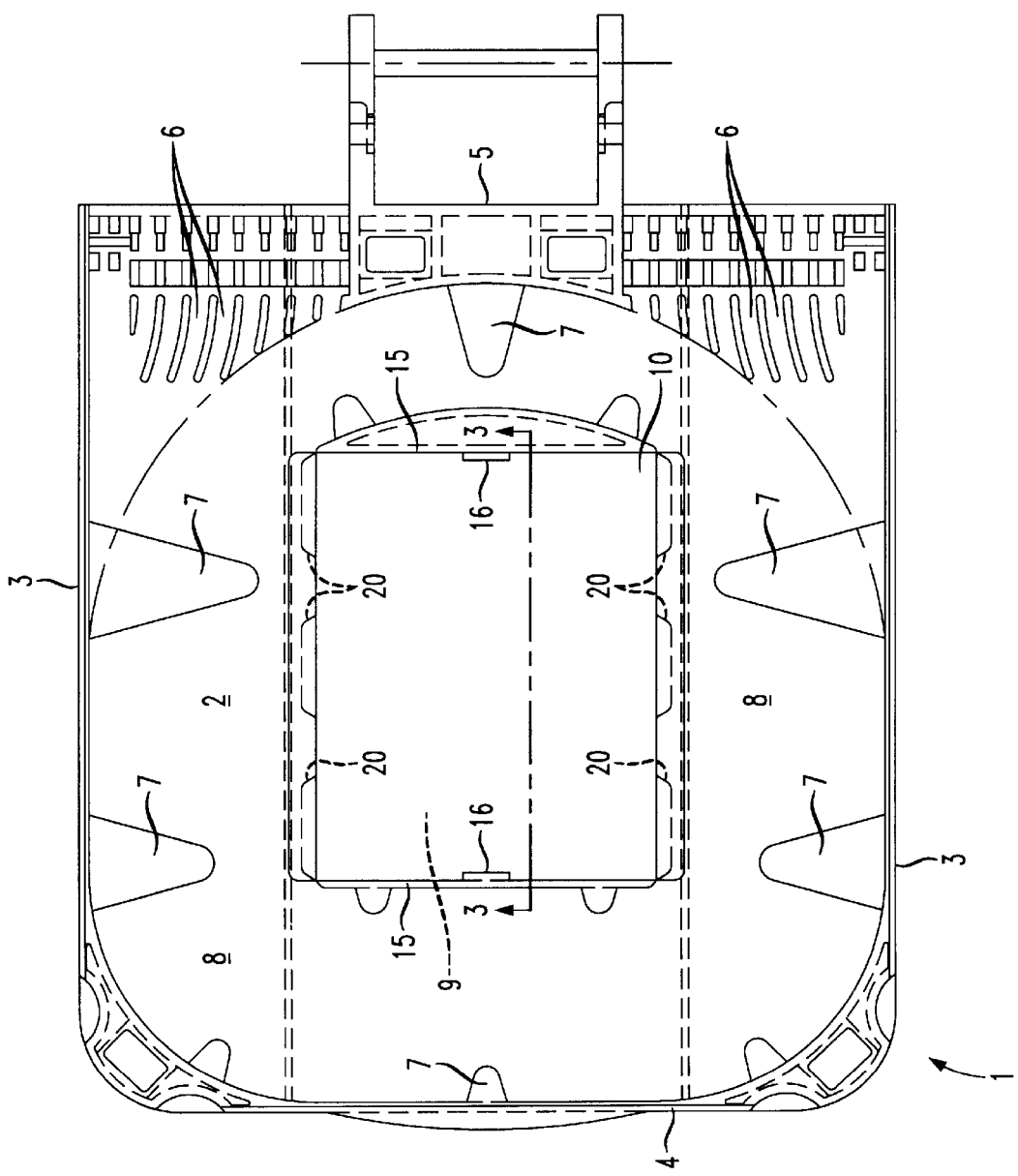

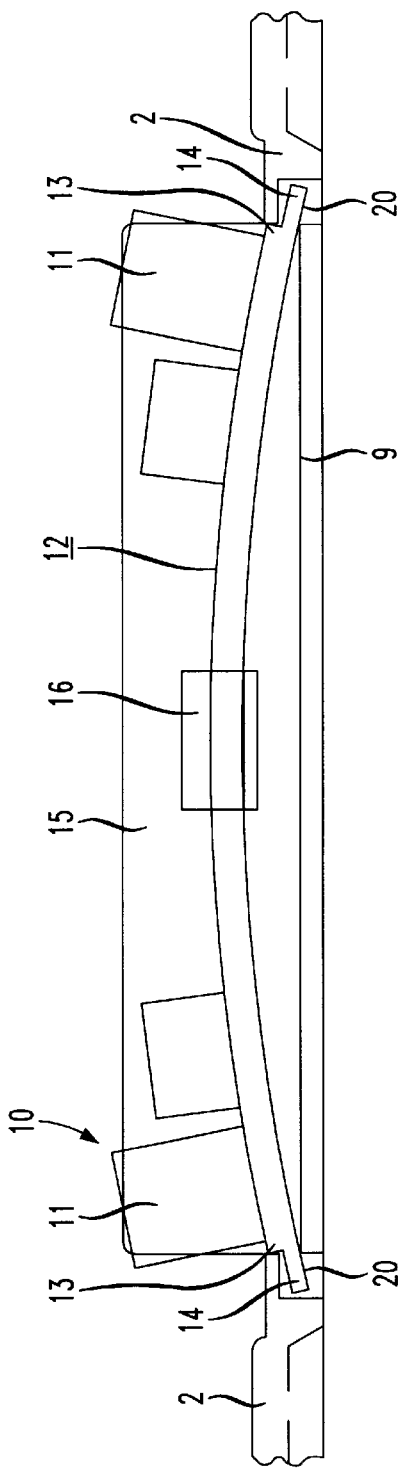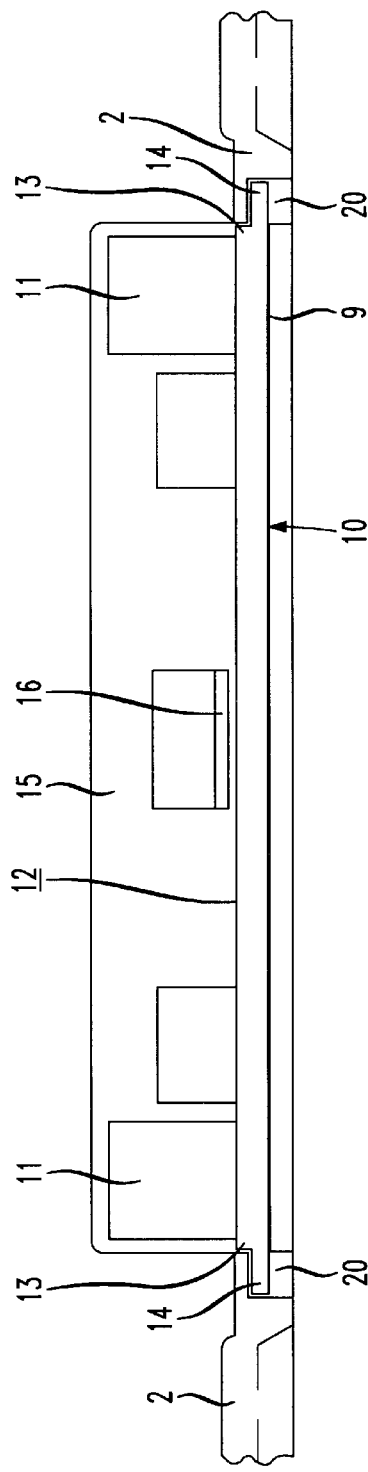

SPLICE HOLDER WITH A SELF-MOUNTING FEATURE

FIELD OF THE INVENTION

The present invention relates to splice holders and more particularly to improved splice holders for fiber optic cables.

BACKGROUND

Fiber optic cables usually require splicing of several such cables together. Splices are used to connect various cables together. To prevent the splices from being damaged, splice holders are provided in which the splices can be placed and easily removed when necessary, such as repair work by a technician. To minimize any damage to and to provide resiliency to frictionally hold the splices, the splice holders are typically made from a foam material. The foam material lacks structural integrity and is required to be mounted on a hard plastic housing for structural support by way of double-sided tape or other methods of attachment. The plastic housing is adapted to be mounted in a fiber optic tray by way of double-sided tape or other methods of attachment. The various parts of prior art splice holders require separate manufacturing processes and assembly steps which increase the cost of such splice holders and often times add to the difficulty of installing additional splice holders in cramped operating environment.

SUMMARY OF THE INVENTION

The present invention avoids these problems and provides a splice holder made from a single resilient piece of material which can be firmly mount on a fiber optic tray without a corresponding plastic housing or adhesive. Hence, the number of parts used by the splice holder and the expense in making it is reduced substantially.

In accordance with the present invention the splice holder is made from a soft material, such as rubber or polyethylene, which is resilient and flexible to provide frictionally holding of splices and has sufficient stiffness itself to provide structural support to the holder for mounting directly onto a tray without a separate housing. Tabs protrude from the edges of the splice holder for mounting the holder directly onto a fiber optic tray. The fiber optic tray includes latches to receive the tabs. The splice holder is bent or bowed about the center and its tabs engage and enter the latches in the fiber optic tray to hold the splice holder in place.

BRIEF DESCRIPTION OF THE DRAWINGS

FIG. 1 is a top plan view of a fiber optic tray made in accordance with the present invention.

FIG. 2 is a front end view thereof.

FIG. 7 is an end view showing the splice holder being mounted in a tray.

FIG. 8 is a view similar to FIG. 6 showing the manner in which the splice holder is held in place in the tray.

DETAILED DESCRIPTION OF THE PREFERRED EMBODIMENTS

Figure 3:
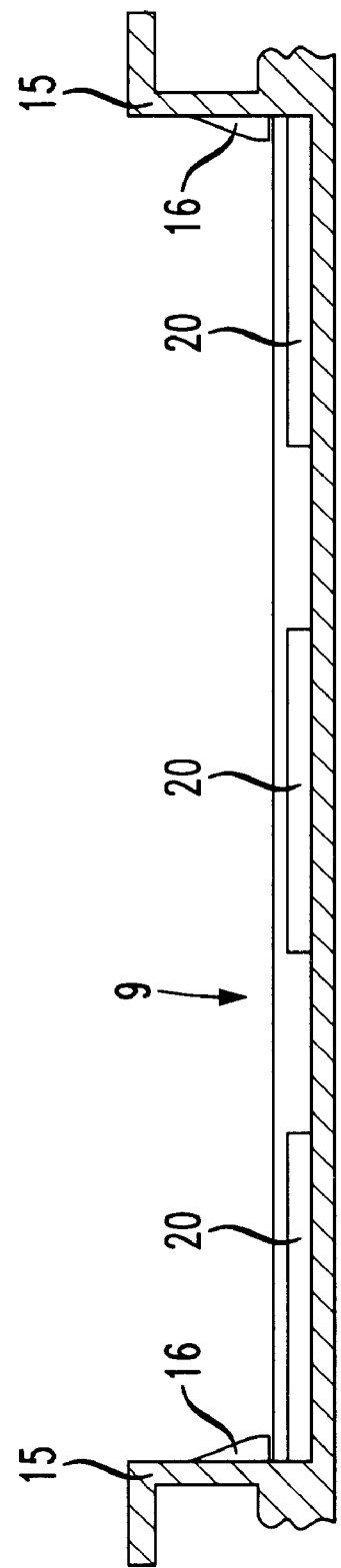
FIG. 3 is a cross-sectional view of countersunk well taken along line 3—3 in FIG. 1.
Figure 4:
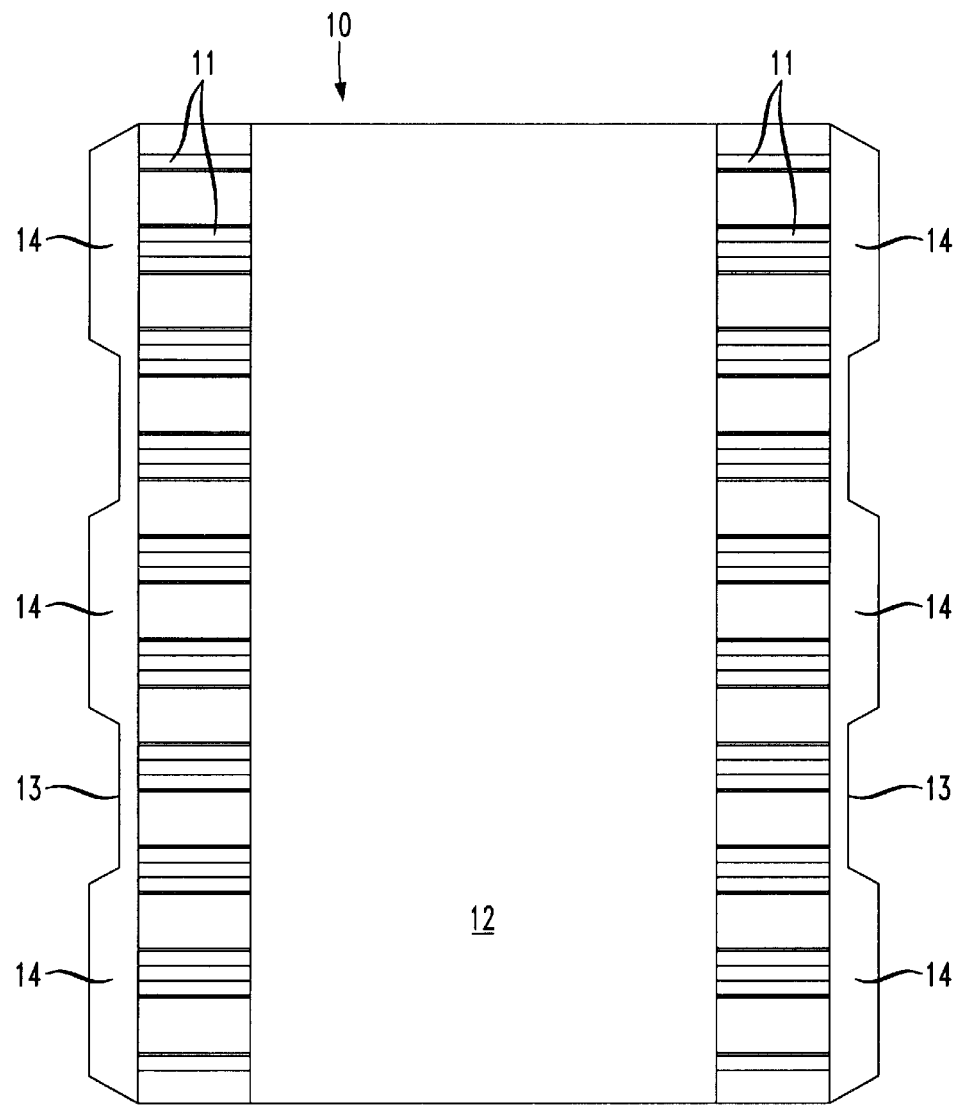
FIG. 4 is a plan view of a splice holder embodying the present invention.

Referring to FIGS. 1 and 2, the fiber optic tray 1 of the present invention comprises a bottom wall 2 having upstanding side and rear walls 3 and 4, respectively. A front handle assembly 5 has a plurality of channels 6 on either side for ingress and egress of fiber optic cables into and out of tray 1. Tabs 7 extend inwardly from the side and rear walls 3 and 4 and from the handle assembly 5 and are spaced above and parallel to the bottom wall 2. Tabs 7 form a trough 8 around which the fiber optic cables can be wound after being introduced into the tray 1.

The bottom wall 2 has a countersunk well 9 which is preferably substantially centrally located and is adapted to receive a splice holder 10. The well 9 is provided with a plurality of latches or undercut recesses 20 extending to the bottom wall and along opposite side edges of the well 9. The undercut recess 20 may be a single elongated undercut recess, or as shown in the drawing, they may be spaced individual undercut recesses 20. As shown in FIG. 3, extending from the front and rear edges of well 9 are two upwardly extending sidewalls 15 with a protrusion 16 extending therefrom into well 9.

Figure 5:
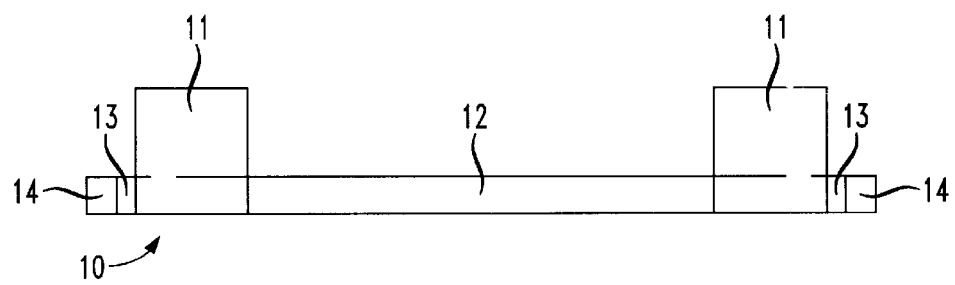
FIG. 5 is an end view of the splice holder.

The splice holder 10 has a plurality of upstanding holding members 11 which are formed in one piece with a base 12 and which are adapted to retain a number of splices (as shown in FIG. 5). The splice holder 10 can be molded in a single piece with the various holding members 11 formed integrally therewith. Different types of holding members 11, molded integrally with base 12 can be used instead of the one shown in FIG. 5. The opposite side edges 13 of the base 12 have holding tabs 14 extending outwardly therefrom. The splice holder 10 is preferably made of a soft material such as polyethylene or rubber which is resilient and flexible.

Figure 6:
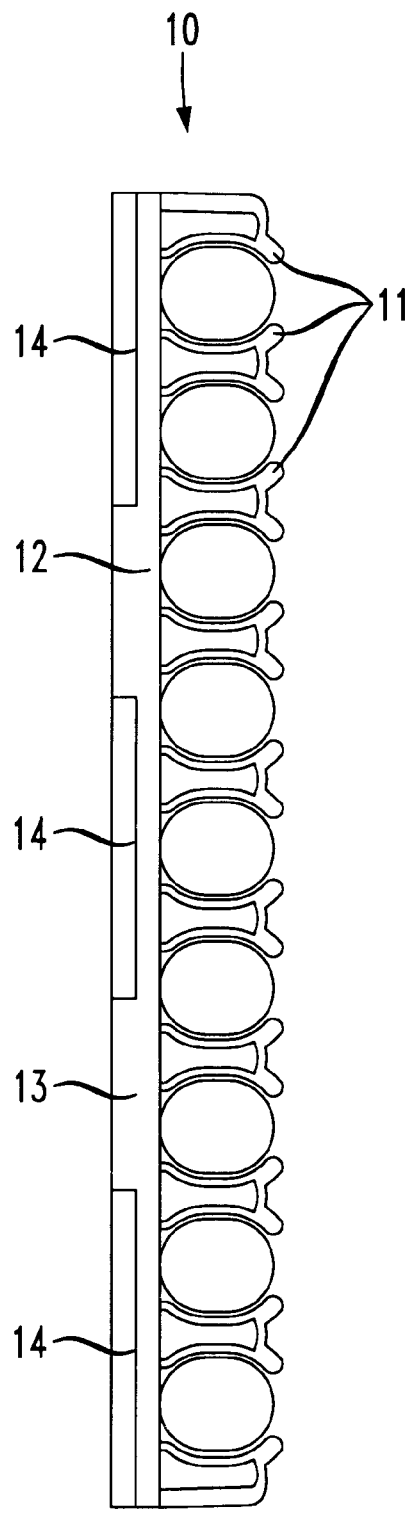
FIG. 6 is a side view thereof.

The splice holder 10 may be mounted on the tray 1 by placing its tabs 14 within the undercut recesses 20. This is shown in FIGS. 6 and 7. The splice holder 10 is bowed or bent upward (FIG. 6) and the tabs 14 are inserted in the undercut recesses 20. Thereafter, the bowed splice holder 10 is straightened out, i.e. bent downwardly, so that its base 12 lies on well 9 and the tabs 14 have entered the undercut recesses 20 and base 12 rest and latched beneath protrusions 16 of sidewalls 15 of well 9 so that the splice holder 10 is held firmly in place (FIG. 7). In this position, the various splices can be removed from the holding members 11 without disturbing the position of the splice holders 10 in the fiber optic tray 1. If a splice holder 10 is to be replaced, it can easily be removed by again bowing the splice holder 10 upwardly and removing the tabs 14 from the undercut recesses 20.

It will thus be seen that the present invention provides an improved splice holder that can be made in one piece of a soft and resilient material which can be easily mounted on and removed from the fiber optic tray, which is stiff enough to provide structural support without a separate plastic housing and is inexpensive to manufacture and maintain.

What is claimed is:

1. A combination of a fiber optic tray and a splice holder for holding splices, said fiber optic tray having a latch element and a splice holder receiving well therein, said receiving well having opposite sides, front and rear sides, at least one sidewall extending perpendicular to said well from said front and rear sides, at least one of said sidewall having a protrusion extending therefrom into said well, said latch element being along said opposite sides, said latch element comprises a plurality of undercut recesses spaced apart along said opposite sides of said well, said splice holder comprises a resilient base having an integral latch engaging element thereon, said latch engaging element comprises at least one tab extending outwardly from said splice holder, said latch element and latch engaging element cooperatively mating with each other in order to permit the splice holder to be mounted in the fiber optic tray and to be removed therefrom by bending said resilient base.

2. A combination as set forth in claim 1 wherein said splice holder further having opposite edges, said latch engaging element comprises a plurality of spaced tabs extending from said opposite edges of said splice holder adapted to enter said spaced undercut recesses on said opposite sides of said well.

3. The combination as set forth in claim 2 wherein said splice holder further having a base, said tabs extend from said base.

4. A combination as set forth in claim 3 wherein said splice holder further having a plurality of holding members to receive splices.

5. A fiber optic tray tor receiving a resilient splice holder for holding splices having
   a latch element therein, and
   a splice holder receiving well having opposite sides, front and rear sides, at least one sidewall extending perpendicular to said well from said front and rear sides, at least one of said sidewall having a protrusion extending therefrom into said well, said latch element being along said opposite sides,
   said latch element comprises at least one undercut recess on said opposite sides of said well and being adapted to cooperate with said splice holder for receiving said splice holder therein by bending said resilient splice holder.

* * * * *